(12) United States Patent
Garg et al.

(10) Patent No.: US 8,290,033 B2
(45) Date of Patent: Oct. 16, 2012

(54) SYSTEMS AND METHODS FOR PERFORMING COMBINED EQUALIZATION IN COMMUNICATION SYSTEMS

(75) Inventors: Rahul Garg, Faridabad (IN); Kunal Lal, New Delhi (IN); Devesh Chauhan, Satyavati Bhaw (IN); Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 952 days.

(21) Appl. No.: 12/351,071

(22) Filed: Jan. 9, 2009

(65) Prior Publication Data

US 2010/0177815 A1    Jul. 15, 2010

(51) Int. Cl.
*H04L 27/01* (2006.01)
(52) U.S. Cl. ...................................................... 375/231
(58) Field of Classification Search .......... 375/229–236, 375/260, 316, 346, 350; 333/18, 28 R; 708/300, 708/322, 323; 379/340, 398; 370/210
See application file for complete search history.

(56) References Cited

U.S. PATENT DOCUMENTS

| | | | | |
|---|---|---|---|---|
| 6,754,261 | B1 * | 6/2004 | Liu et al. | 375/232 |
| 6,819,716 | B1 * | 11/2004 | Purkovic et al. | 375/240.26 |
| 6,965,651 | B1 * | 11/2005 | Chou | 375/340 |
| 7,133,444 | B2 * | 11/2006 | Li et al. | 375/222 |
| 7,711,059 | B2 * | 5/2010 | Yeh et al. | 375/260 |
| 2003/0063680 | A1 * | 4/2003 | Nedic et al. | 375/260 |
| 2004/0114542 | A1 * | 6/2004 | Stopler | 370/286 |

OTHER PUBLICATIONS

Henkel, Taubock, Odling et. al. "The Cyclic Prefix of OFDM/DMT—An Anaysis", Seminar on Broadband Communications, 2002. Access, Transmission, Networking. 2002 Zurich Feb. 19-21, 2002 pp. 22-1-22-3.
Martin, Ding, Milosovic et. al. "Unification and Evaluation of Equalization Structures and Design Algorithms for Discrete Multitone Modulation Systems", in IEEE Transactions on Signal Processing, vol. 53, Issue 10, Part 1, Oct. 2005.
Katleen Van Acker, Geert Leus, Marc Moonen, Oliver Van De Wiel, and Thierry Pollet, "Per Tone Equalization for DMT-Based Systems" IEEE Transactions on Communications, vol. 49, No. 1, Jan. 2001.
Simon Armour, Andrew Nix, David Bull, "Use of Linear Transverse Equalisers and Channel State Information in Combined OFDM-Equalisation" The 11th IEEE International Symposium on vol. 1, Issue , 2000 pp. 615-619 vol. 1.
ITU-T G992.3 Series G: Transmission Systems and Media, Digital Systems and Networks Digital sections and digital line system—Access networks Asymmetric digital subscriber line transceivers 2 (ADSL2); Jul. 2002.

* cited by examiner

*Primary Examiner* — Khanh C Tran
(74) *Attorney, Agent, or Firm* — Mark J. Danielson; Pillsbury Winthrop Shaw Pittman LLP (57) ABSTRACT

A system is described for performing combined equalization. The system comprises a time domain equalizer (TEQ) configured to receive a signal and shorten a CIR (channel impulse response) of the received signal, a Fast Fourier Transform (FFT) module for demodulating the received signal, and an equalization block for reducing inter-carrier interference (ICI) and inter-symbol interference (ISI). The equalization block comprises at least one of: a feed forward equalizer and a feed back equalizer. The system further comprises a slicer circuit configured to generate a hard-limited decision for a symbol corresponding to the received signal.

34 Claims, 11 Drawing Sheets

CONFIGURATION A

CONFIGURATION B

SYSTEMS AND METHODS FOR PERFORMING COMBINED EQUALIZATION IN COMMUNICATION SYSTEMS

TECHNICAL FIELD

The present disclosure generally relates to communications and more particularly relates to systems and methods for performing combined equalization in a communication system, for example, but not limited to, a DMT (discrete multi-tone) system.

BACKGROUND

In ADSL (asymmetric digital subscriber line) systems based on DMT (discrete multi-tone) modulation, an incoming serial bit-stream is typically divided into parallel streams, which are used for performing quadrature amplitude modulation (QAM) on the various tones. After modulation is performed with an inverse fast Fourier transform (IFFT), a cyclic prefix (CP) is added to each symbol. If the prefix is longer than the channel impulse response (CIR), demodulation can be implemented by passing the received signal through an FFT followed by a complex 1-tap frequency-domain equalizer (FEQ) for each tone in order to compensate for channel amplitude and phase effects.

A long prefix, however, results in large overhead with respect to the data rate. One approach to this problem is to insert a (real) time-domain equalizer (TEQ) before the demodulation phase in order to shorten the channel impulse response to fit within the CP. One perceived shortcoming with this approach, however, is that if the channel is "imperfectly" shortened where the CIR does not fit within the CP, intersymbol interference (ISI) between two successive symbols and inter-carrier interference (ICI) between different carriers arises. As such, those skilled in the art will appreciate that there is a need for addressing the undesirable side effects of an imperfectly shortened channel.

SUMMARY

Briefly described, one embodiment, among others, is a system that comprises a time domain equalizer (TEQ) configured to receive a signal and shorten a CIR (channel impulse response) of the received signal, a Fast Fourier Transform (FFT) module for demodulating the received signal, and an equalization block for reducing inter-carrier interference (ICI) and inter-symbol interference (ISI). The equalization block comprises at least one of: a feed forward equalizer and a feed back equalizer. The system further comprises a slicer circuit configured to generate a hard-limited decision for a symbol corresponding to the received signal.

Another embodiment includes a method for performing combined equalization. The method comprises deriving coefficients for a feed forward equalizer and a feed back equalizer, selecting a set of bins in which to apply the feed forward equalizer and the feed back equalizer, canceling interference components at outputs of neighboring sub-carriers to produce an output with reduced inter-carrier interference (ICI), and subtracting a stored output decision for sub-carriers from a symbol of a prior received signal from an output decision for a symbol of the received signal to produce an output with reduced inter-symbol interference (ISI).

Yet another embodiment is a computer readable medium storing a program executable on a processor. In accordance with such embodiments, the program comprises equalization logic for reducing inter-carrier interference (ICI) and inter-symbol interference (ISI) from neighboring tones on a received signal, logic for generating a hard-limited decision for a symbol corresponding to the received signal, and training logic for deriving coefficients for the equalization logic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
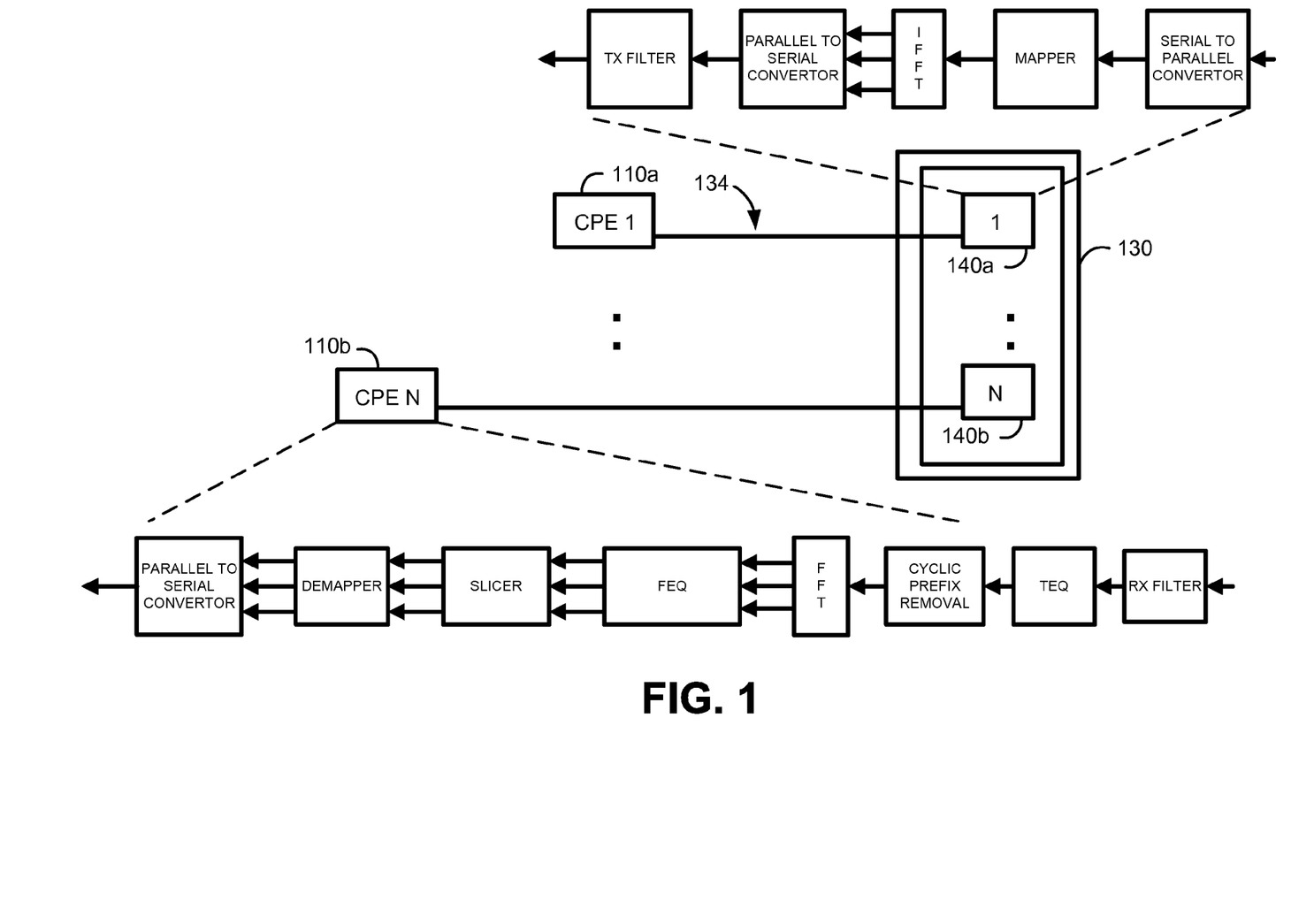
FIG. 1 depicts a transmitter and a receiver in an XDSL system.

In a DMT-based XDSL system, time domain equalization (TEQ) is typically used to reduce the delay spread of the twisted copper line channel such that the equalized channel impulse response can be accommodated by the length of the cyclic prefix. Reference is made to FIG. 1, which depicts a transmitter and a receiver in an XDSL system. In the non-limiting example shown in FIG. 1, N clients (or N sets of CPE 110*a*, 110*b*) are depicted. The end users 110*a*, 110*b* are connected via a loop 134 to a central office (CO) 130. The CO 130 may include an xDSL access multiplexer (DSLAM), xDSL line cards 140a, 140b, and other equipment for interfacing with the CPE 110a, 110b.

As described in the background section, in a DMT-based system, an incoming serial bit-stream is typically divided into parallel streams via a serial-to-parallel converter, which are used for performing quadrature amplitude modulation (QAM) on the various tones. In the transmit path, after modulation is performed via an inverse fast Fourier transform (IFFT) block, a cyclic prefix is added to each symbol. If the prefix is longer than the channel impulse response (CIR), demodulation can be implemented on the receive path by an FFT block, followed by a complex one-tap frequency-domain equalizer (FEQ) for each tone to compensate for the channel amplitude and phase effects. One perceived shortcoming with inserting a time domain equalizer before the demodulation phase to shorten the channel impulse response, however, is that if the channel is "imperfectly" shortened (where the CIR does not fit within the duration of the cyclic prefix), this may result in inter-symbol interference (ISI) between two successive symbols and inter-carrier interference (ICI) between different carriers.

Various approaches exist for reducing inter-symbol interference (ISI) and inter-carrier interference (ICI) at the output of the time domain equalizer (TEQ) at the client. One approach involves per-tone equalization that achieves the maximum capacity on each of the sub-carriers. However, one perceived shortcoming with this approach is that the computational requirements are very high. Another approach involves use of decision feedback equalization (DFE) for mitigating ISI and ICI in OFDM (orthogonal frequency-division multiplexing) applications. This approach, however, has not been applied to DMT-based systems. Moreover, DFE training based on current DSL standards have not been incorporated. Embodiments for performing combined equalization in DMT (discrete multi-tone) systems are described that comprise one or more equalizers that work in conjunction with each other. By incorporating combined equalization, the attainable data rate is significantly improved when compared to conventional approaches to reducing large overhead with respect to the data rate.

Figure 2:
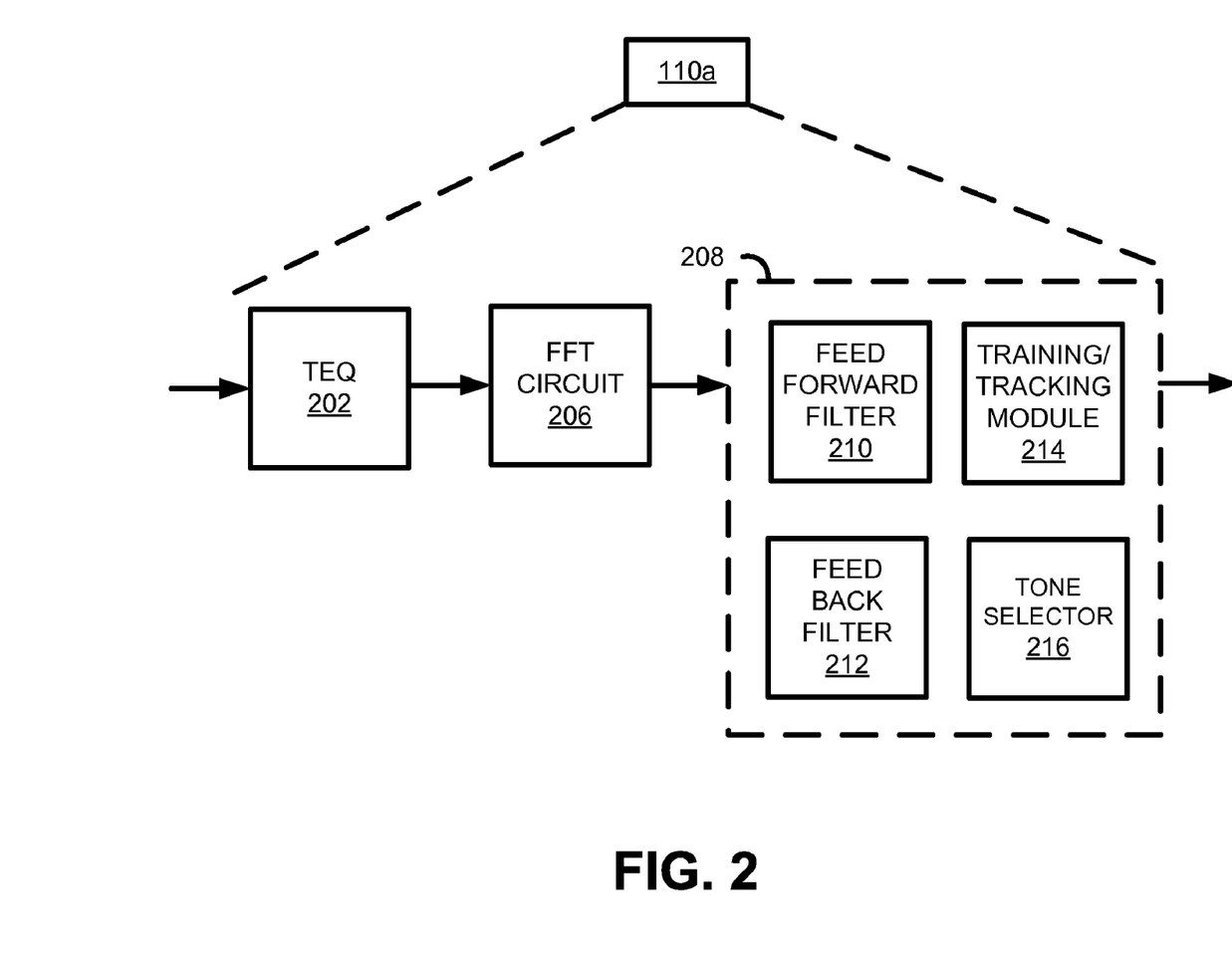
FIG. 2 depicts an embodiment of a combined equalizer in one of the clients depicted in FIG. 1.

Reference is made to FIG. 2, which depicts an embodiment of a combined equalizer in one of the clients 110a depicted in FIG. 1. For some embodiments, the client 110a may comprise a time domain equalizer (TEQ) 202 configured to shorten the channel impulse response. The TEQ 202 is configured to shorten the duration of the channel impulse response (CIR) to within the duration of the cyclic prefix. By shortening the duration of the CIR, the effects of both ISI and ICI are mitigated.

For some embodiments, a one-tap FEQ is utilized to address the residual equalization requirement. It should also be noted that the combined equalizer described herein works independently of the particular implementation of the time domain equalizer used to shorten the duration of the channel impulse response (CIR). Referring back to FIG. 2, the received signal is demodulated by the FFT circuit 206. The demodulated signal is then forwarded to the next block 208, which comprises a combination of a frequency domain feed forward filter 210 and a feed back filter 212.

The frequency domain feed forward equalizer 210 is configured to operate across sub-carriers at the output of the FFT for performing inter-carrier interference (ICI) cancellation. The frequency domain feed back equalizer 212 is configured to operate across received symbols. In accordance with some embodiments, the frequency domain feed back equalizer provides inter-symbol interference (ISI) cancellation. The combined equalizer 208 further comprises a training/tracking module 214 configured to compute the filter coefficients for both the feed forward filter 210 and the feed back filter 212. The combined equalizer 208 also includes a tone selector 216 for selecting frequency bins in which the feed forward filter 210 and the feed back filter 212 are optimally applied. The training/tracking and tone selection processes are described later. Having described the basic components of a combined equalizer, the feed forward filter and the feed back filter are now described in more detail.

The maximum level of ICI (inter-carrier interference) observed on a sub-carrier at the FFT output is generally caused by neighboring or nearby sub-carriers. The feed forward equalizer mitigates the effects of ICI by canceling the interference components at the output of neighboring sub-carriers. For purposes of this disclosure, let $A(i, m)$ represent the output of the FFT (input to the feed forward equalizer) for sub-carrier (i) and symbol (m). Furthermore, let $w(i, i-p)$ denote the feed forward equalizer coefficient from sub-carrier (i-p) to sub-carrier (i), and let $B(i, m)$ represent the output from the feed forward equalizer for sub-carrier (i) and symbol (m). The output from the feed forward equalizer for sub-carrier (i) and symbol (m) may be calculated based on any one of the following equations below as the contribution from neighboring sub-carriers may be sampled at various stages of the equalization path:

$$B(i, m) = \left( A(i, m) - \sum_{p=1}^{n} w(i, i-p) B(i-p, m) - \sum_{p=1}^{n} w(i, i+p) A(i+p, m) \right) \times w(i, i) \quad \text{(Eq. 1)}$$

$$B(i, m) = \left( A(i, m) - \sum_{p=1}^{n} w(i, i-p) A(i-p, m) - \sum_{p=1}^{n} w(i, i+p) A(i+p, m) \right) \times w(i, i) \quad \text{(Eq. 2)}$$

$$B(i, m) = \left( A(i, m) - \sum_{p=1}^{n} w(i, i-p) C(i-p, m) - \sum_{p=1}^{n} w(i, i+p) A(i+p, m) \right) \times w(i, i) \quad \text{(Eq. 3)}$$

Figure 3:
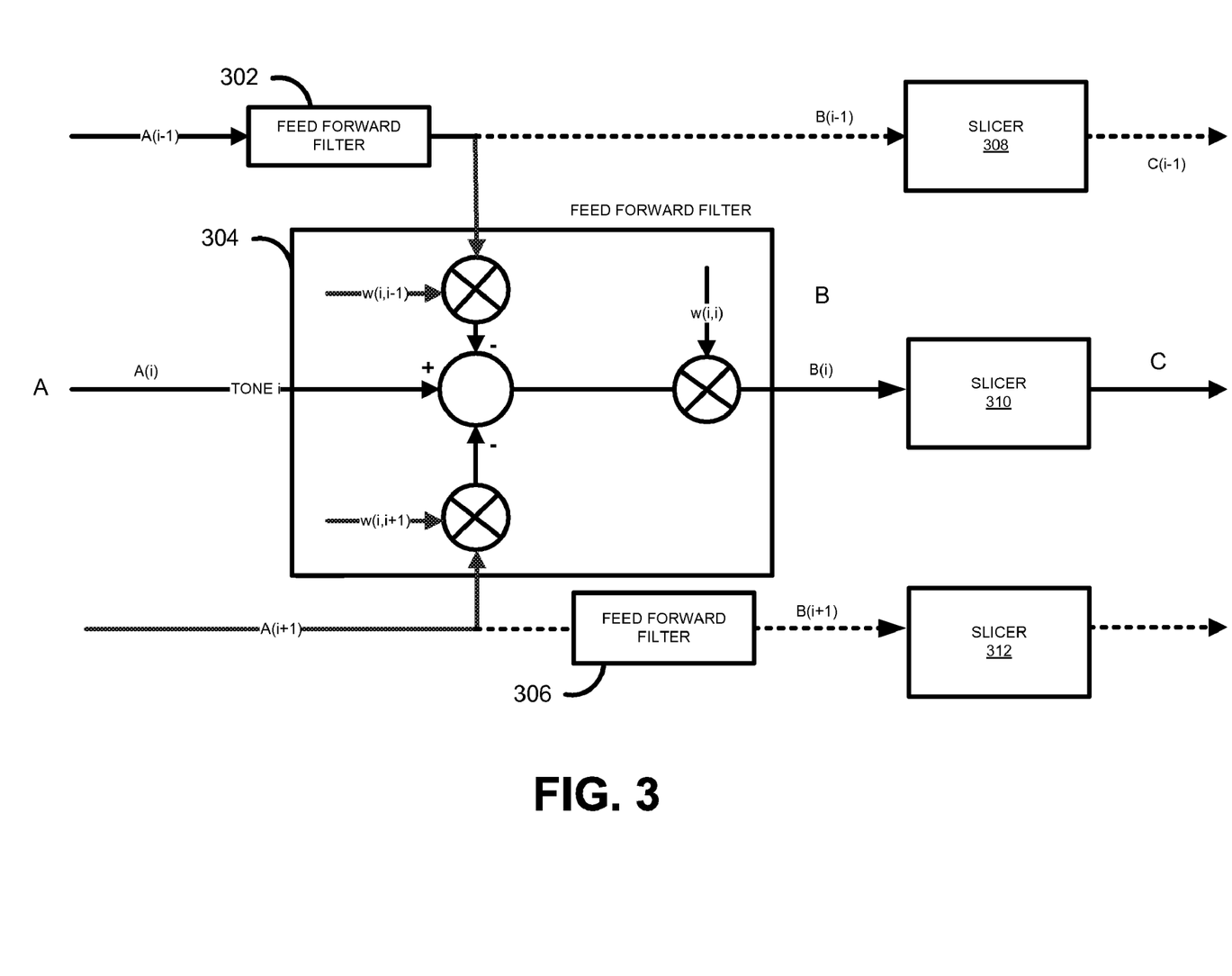
FIG. 3 depicts an embodiment of the feed forward filter shown in FIG. 2.
Figure 5:
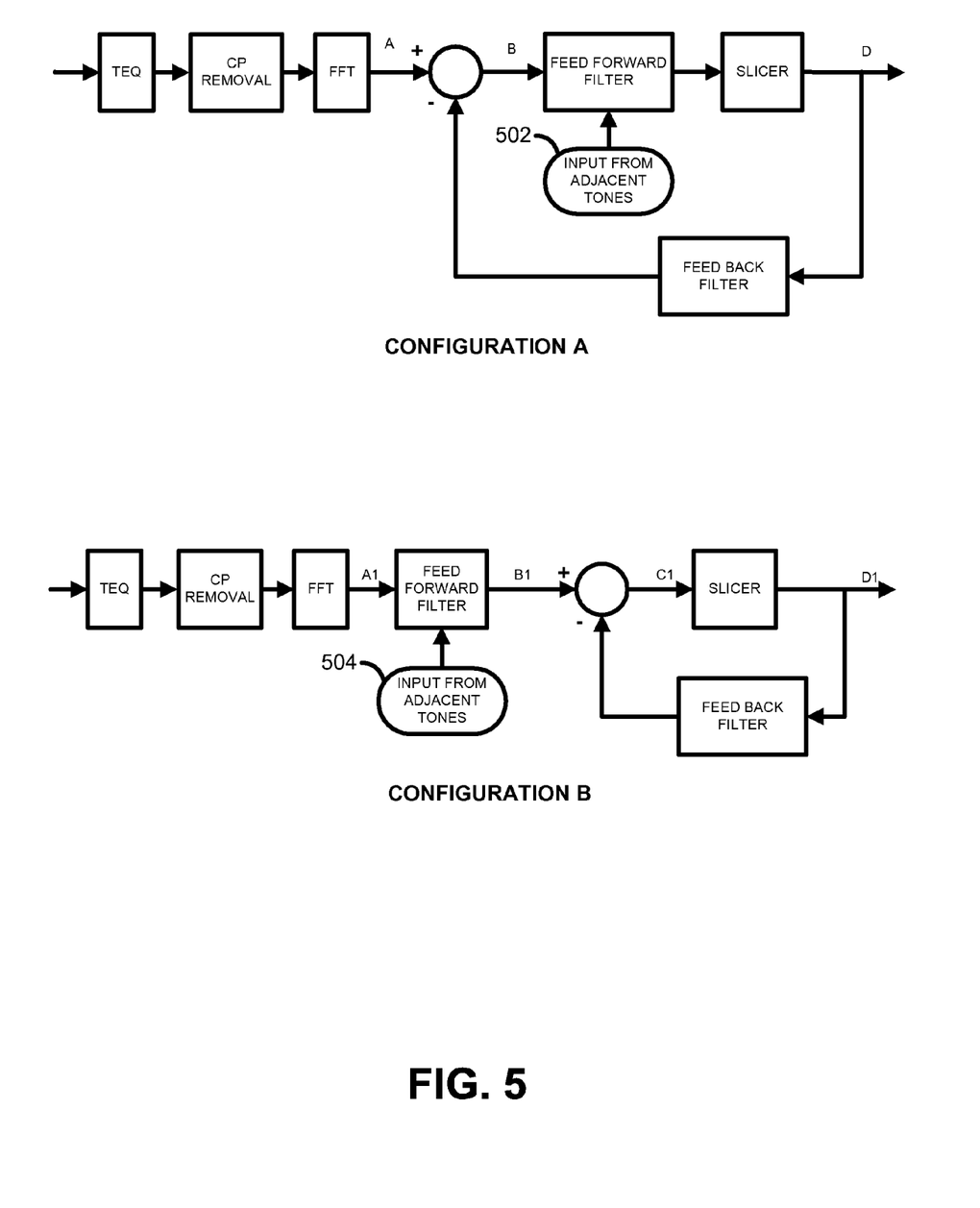
FIG. 5 depicts various ways in which the feed forward filter and the feed back filter depicted in FIGS. 3 and 4 may be configured with respect to each other.

FIG. 3 shows an embodiment of the feed forward structure shown in FIG. 2 for mitigating the effects of ICI based on Equation 1 above. In particular, the feed forward structure is shown for two adjacent taps followed by a one-tap FEQ. In accordance with some embodiments, the feed forward equalizer coefficient $w(i, i)$ may also be placed in front of the ICI compensation stage. Referring briefly to FIG. 5, FIG. 5 illustrates various ways in which the feed forward filter and the feed back filter may be configured with respect to each other. The contributions from neighboring sub-carriers 502, 504 may be sampled at any of the various equalization stages (i.e., A, B, C or D for configuration A and A1 B1, C1 or D1 for configuration B). It should be noted, however, that while FIG.

5 illustrates various configurations for combining the feed forward filter with the feed back filter, each filter may also be implemented separately and independently of the other filter.

Figure 4:
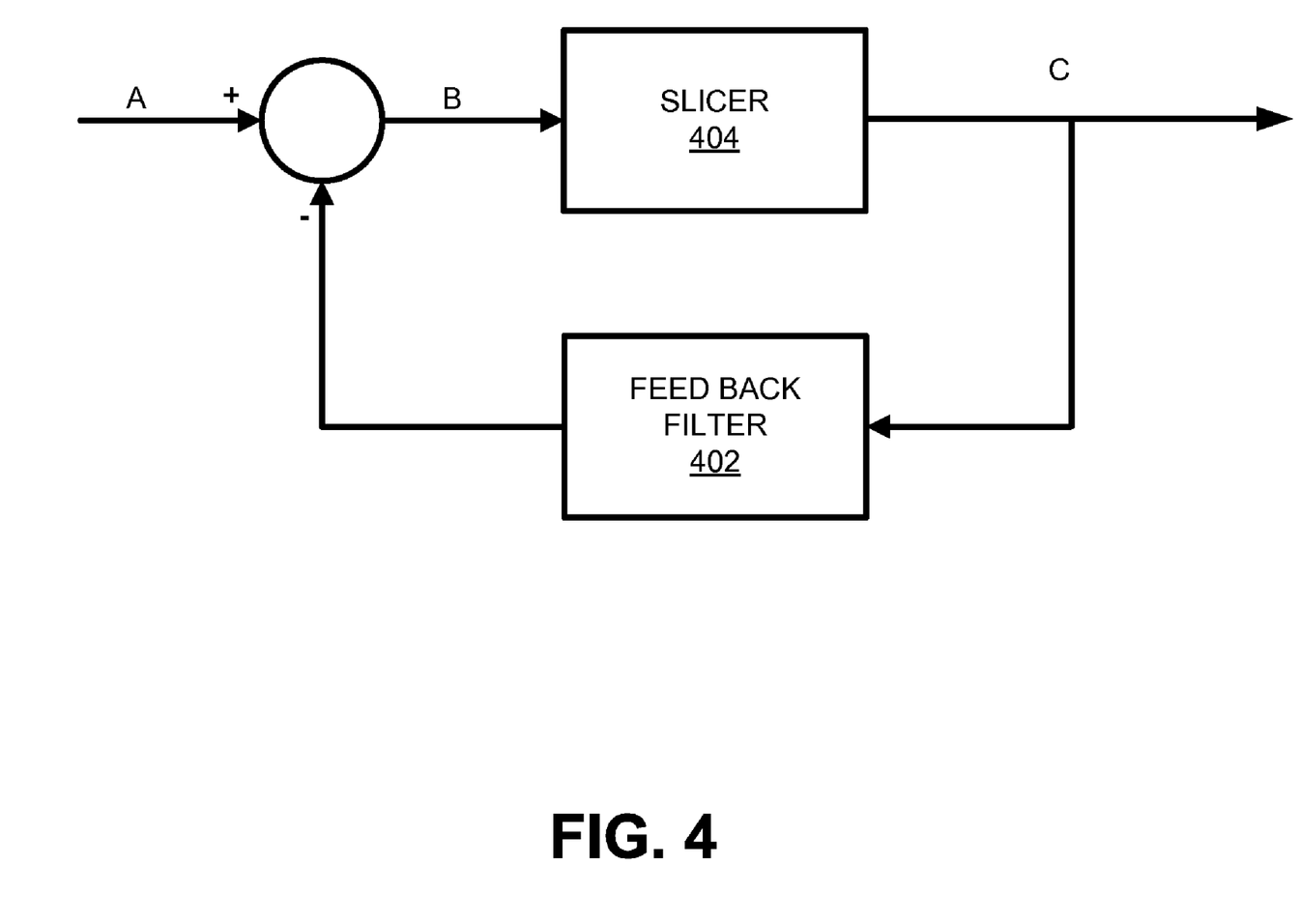
FIG. 4 depicts an embodiment of the feed back filter shown in FIG. 2.

Reference is now made to FIG. 4, which depicts an embodiment of the feed back structure for mitigating the effects of ISI. Each sub-carrier output B(i, m) is sent to a slicer 404, which outputs the hard-limited decision for that symbol. The decision output for the sub-carriers from a previous symbol is stored and subtracted from the current symbol to reduce the effects of ISI. Let A(i, m) denote the output of the FFT (or the input to the feed forward equalizer) for sub-carrier (i) and symbol (m). Let g(i, i−1) denote the feed-back equalizer coefficients for symbol (i−1) to symbol (i). Finally, assuming that C(i, m) represents the output from the feed forward equalizer for sub-carrier (i) and symbol (m), the output from the feed forward filter/equalizer 304 for sub-carrier (i) and symbol (m) may be calculated based on the following:

$$B(i, m)=(A(i, m)-g(i, i-1)\times C(i, m-1)) \quad \text{(Eq. 4)}$$

For other embodiments of the feed back structure shown in FIG. 4, a one-tap FEQ may be inserted at either nodes A or B.

With regards to computational resources, the feed back filter described above requires only one complex multiplication and one complex addition for each symbol per sub-carrier. A feed forward filter with n inputs from adjacent sub-carriers will need n complex multiplications and n complex additions for each sub-carrier the feed forward filter is used for. Regarding storage requirements, the feed back filter only requires storage of one complex coefficient in addition to storage for one complex data for the previous symbol's output for each sub-carrier. A feed forward filter with n adjacent sub-carriers needs n complex coefficients for each sub-carrier the feed forward filter equalizes. No additional data memory is required.

Although it is possible to improve performance of the feed forward filter by receiving inputs from an increasing number of neighboring tones, saturation generally occurs when inputs are received for more than two adjacent sub-carriers. Similarly, the feed back filter can substantially reduce the error by storing only the slicer output for one previous symbol for the same sub-carrier. An improvement in performance may be obtained by increasing the number of symbols or the number of sub-carriers fed back from the previous symbol.

Referring now to FIG. 5, both the feed forward filters and feed back filters described above may be used in tandem in various configurations. Furthermore, if neighboring tones also undergo combined equalization as described above, the input from these sub-carriers for feed forward equalization of the current sub-carrier may be taken from any point (A, B, C, D) along the equalization chain, as shown in FIG. 5. In accordance with other embodiments, the feed forward filters and feed back filters may be implemented separately such that they work independently of each other.

Having described the components of the combined equalizer, the training and tracking functions of the combined equalizer and in particular, the training/tracking module 214 shown in FIG. 2, are now described. Generally, training can be performed using various approaches. In one approach, training is performed based on apriori knowledge of the set of tones used. In another approach, training is first performed using a given set of tones. Based on the magnitude of the feed forward and feed back coefficients, certain tones are then selected for training purposes. In compliance with the training phase performed in ADSL2+ systems, time domain equalizers are typically trained during one of the Reverb transmission periods defined in ITU G.992.5. The Reverb signal is utilized because it is a periodic sequence which can be used for the training phase using a scheme such as a MMSE (minimum mean square error) scheme. A typical implementation may use C-Reverb3 for the training during the training phase of startup. Typically, the feed forward equalizer may be trained with a periodic sequence, and the feed back equalizers may be trained utilizing an aperiodic sequence. For some embodiments, the feed forward equalizer may also be trained using an aperiodic sequence.

For some embodiments, the Medley sequence as specified in the ITU-T ADSL standards (e.g., ITU-T G992.3) is utilized during the Channel Analysis phase of startup. The Medley sequence is a pseudo-random binary sequence with low correlation between successive symbols and adjacent tones. As this is a known sequence, the Medley sequence may be stored or generated at the receiver and used to compute the error after the FEQ. For such embodiments, to compute the feed back filter coefficients during training, the correlation between the current error for a sub-carrier and the Medley data transmitted on that sub-carrier for the previous symbol is used. For feed forward equalizers, the value on an adjacent sub-carrier in the current symbol is used.

Figure 6:
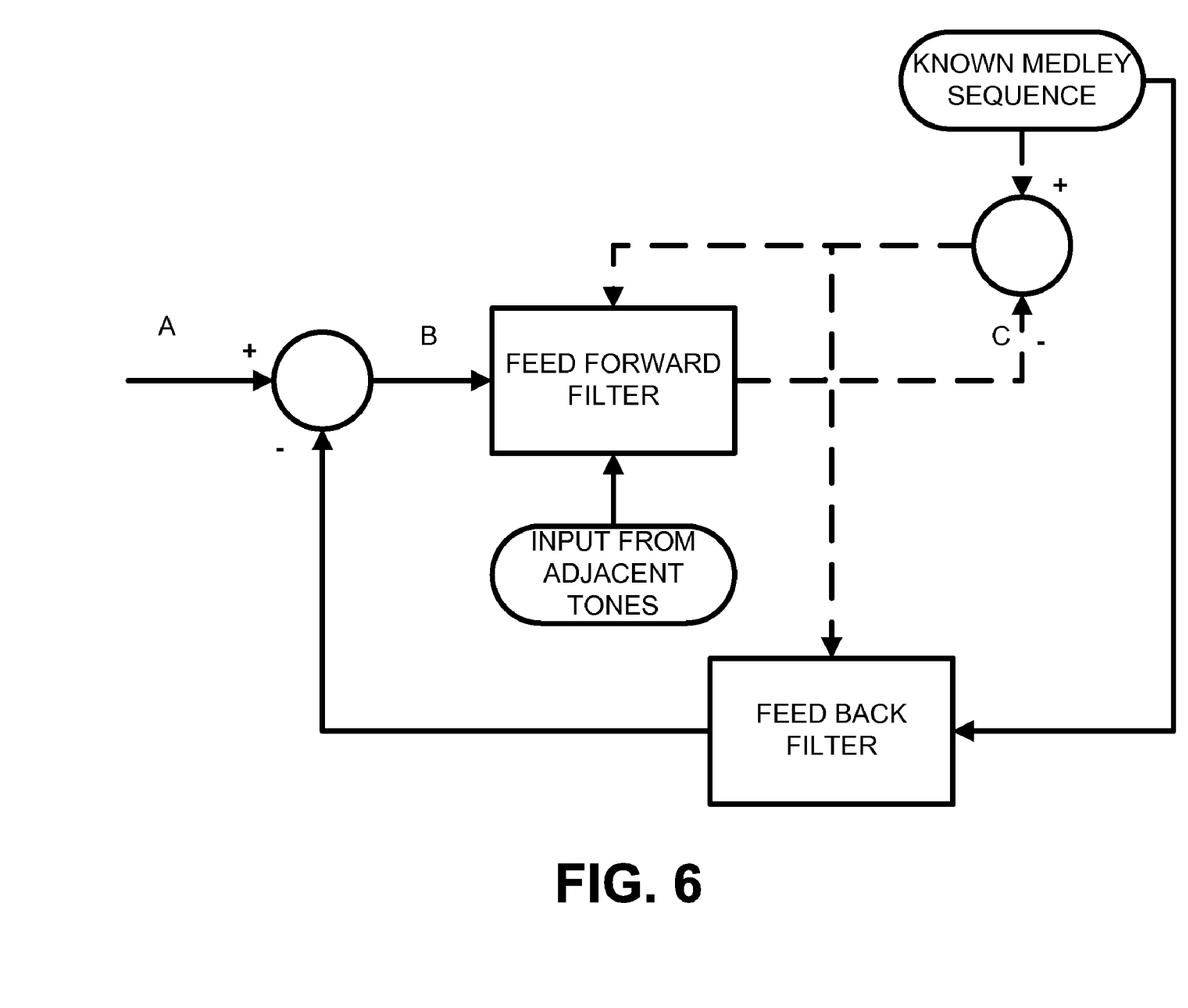
FIG. 6 depicts the signal flow during the training phase for the combined equalizer shown in FIG. 2.

Reference is now made to FIG. 6, which depicts the signal flow during the training phase for the combined equalizer shown in FIG. 2. The dashed lines represent the path of the error signal, which is used to update the feed forward filter and feed back filter coefficients. Some of the common techniques for updating the coefficients may involve using a block technique (i.e., Weiner's principle) or using an LMS (least mean squares)/RLS (recursive least squares) recursive update approach. In accordance with other embodiments, the combined equalizer may be trained using a combination of periodic and aperiodic signals. In particular, the feed forward filter may be trained using the Reverb sequence while the feed back filter may be trained using the Medley sequence.

Figure 7:
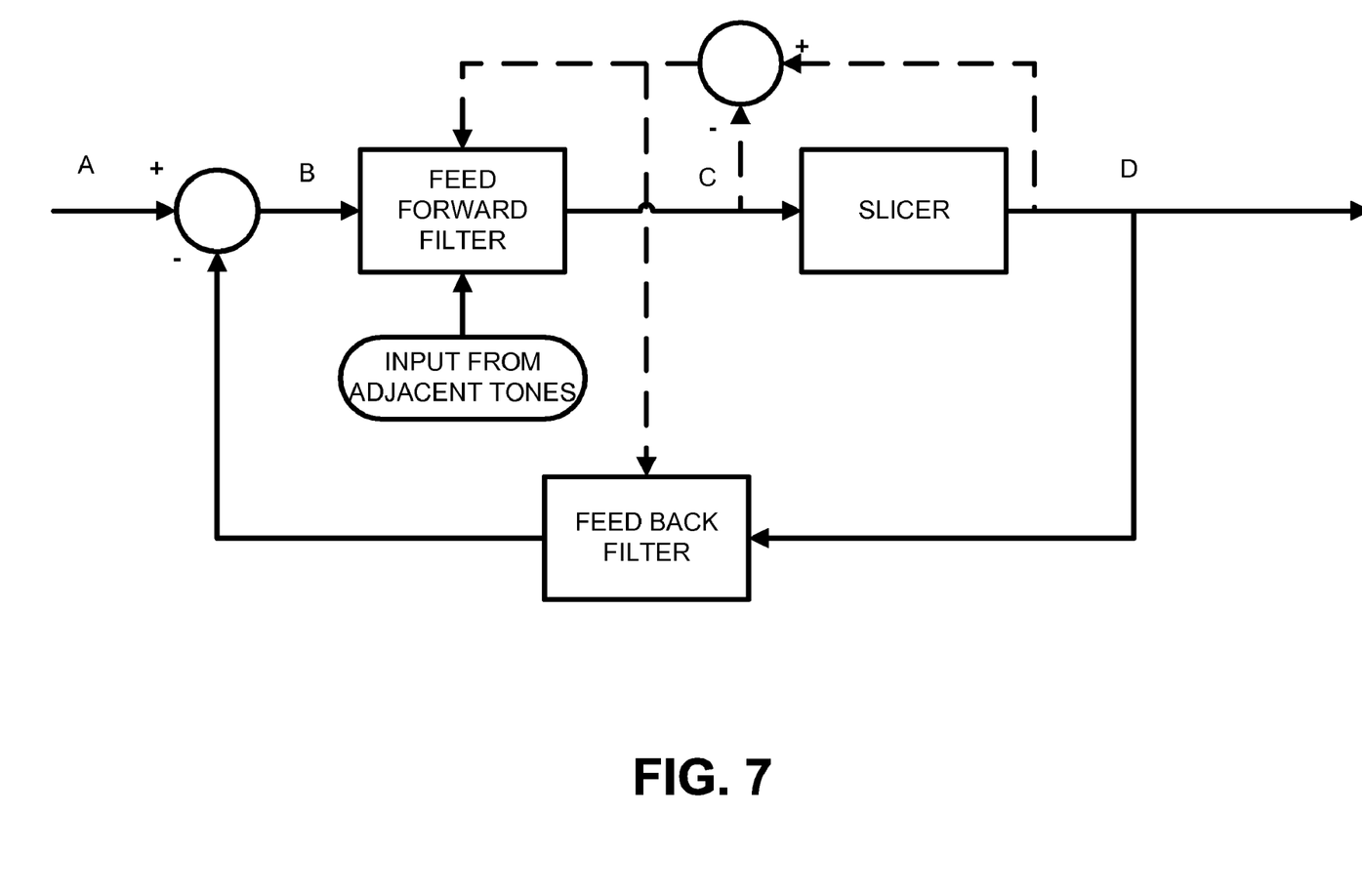
FIG. 7 depicts the signal flow during showtime tracking for the combined equalizer shown in FIG. 2.

It should be emphasized that with other embodiments, the coefficients for the feed forward and feed back filters may also be dynamically trained during showtime (during transmission of actual data). For such embodiments, the error observed on each bin is correlated with the data in the previous symbol or on adjacent sub-carriers. The effectiveness of the showtime tracking feature depends on the nature of the data, which can be assumed to be statistically white. This signal flow for showtime tracking of the feed forward and feed back filter coefficients is shown in FIG. 7. Again, the dashed lines represent the path of the error signal, which is used to update the feed forward filter and feed back filter coefficients.

Tone selection for the combined equalizer is now described. Although the combined equalizer described herein may be applied to all the tones, the performance gain experienced by the combined equalizer is maximized over a subset of tones. Various embodiments for tone selection may thus be incorporated and may be based on various metrics, including, but not limited to: the SNR (signal-to-noise ratio) of the tones, the band of tones in which maximum improvement is expected, tones closest to the next integer bits of loading, and tones selected based on bit loading. For tones selected based on bit loading, this method may be used to identify tones that require a minimum SNR increase in order to achieve the maximum data-rate increase. This method may also be used to identify bins that are more affected by ISI and ICI.

Figure 8:
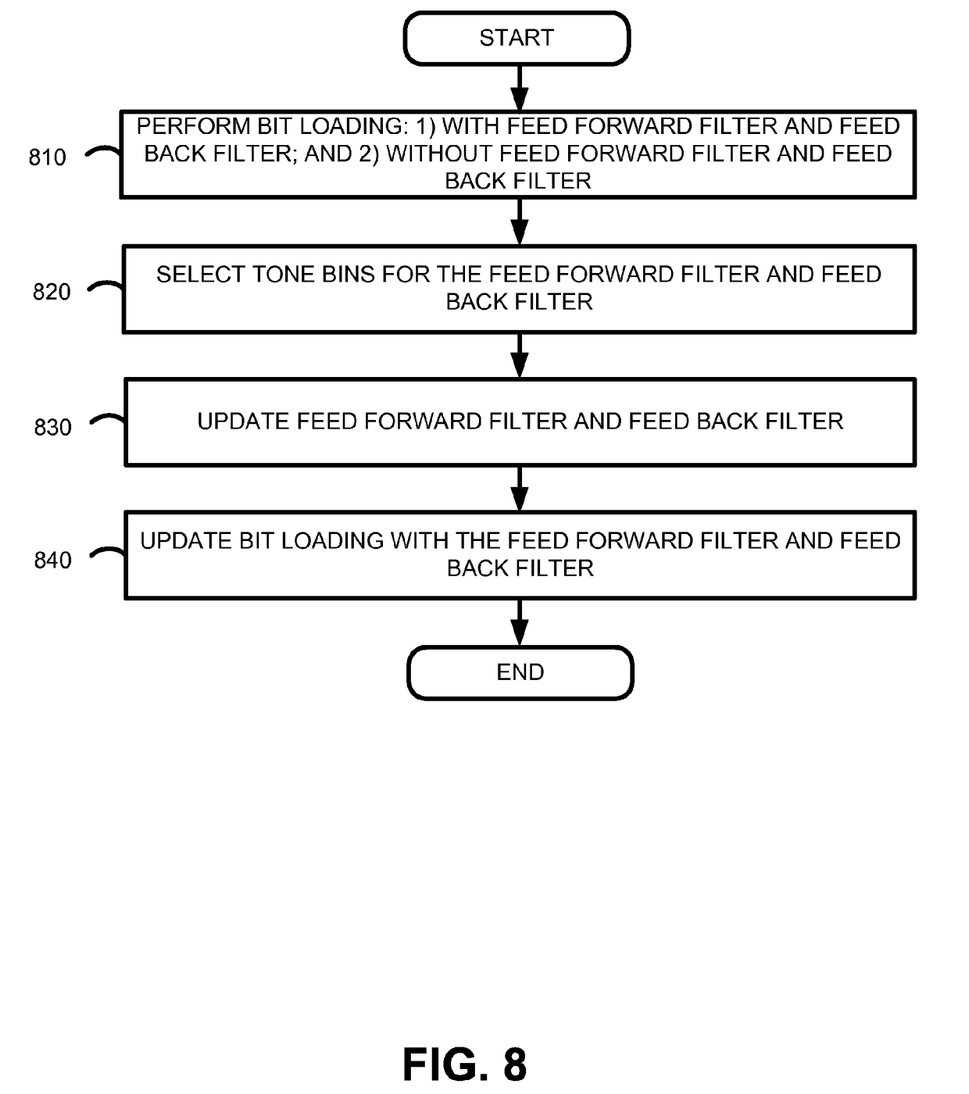
FIG. 8 is a flow diagram demonstrating bit loading driven tone selection.

FIG. 8 is a flow diagram demonstrating bit loading driven tone selection. Beginning with block 810, bit loading is performed with and without both the feed forward filter and the feed back filter. In block 820, bins associated with particular tones are selected for the feed forward filter and the feed back filter. In block 830, the feed forward filter and feed back filter are updated. In accordance with some embodiments, once updating is complete, bit loading is performed with both the feed forward filter and the feed back filter active.

Figure 9:
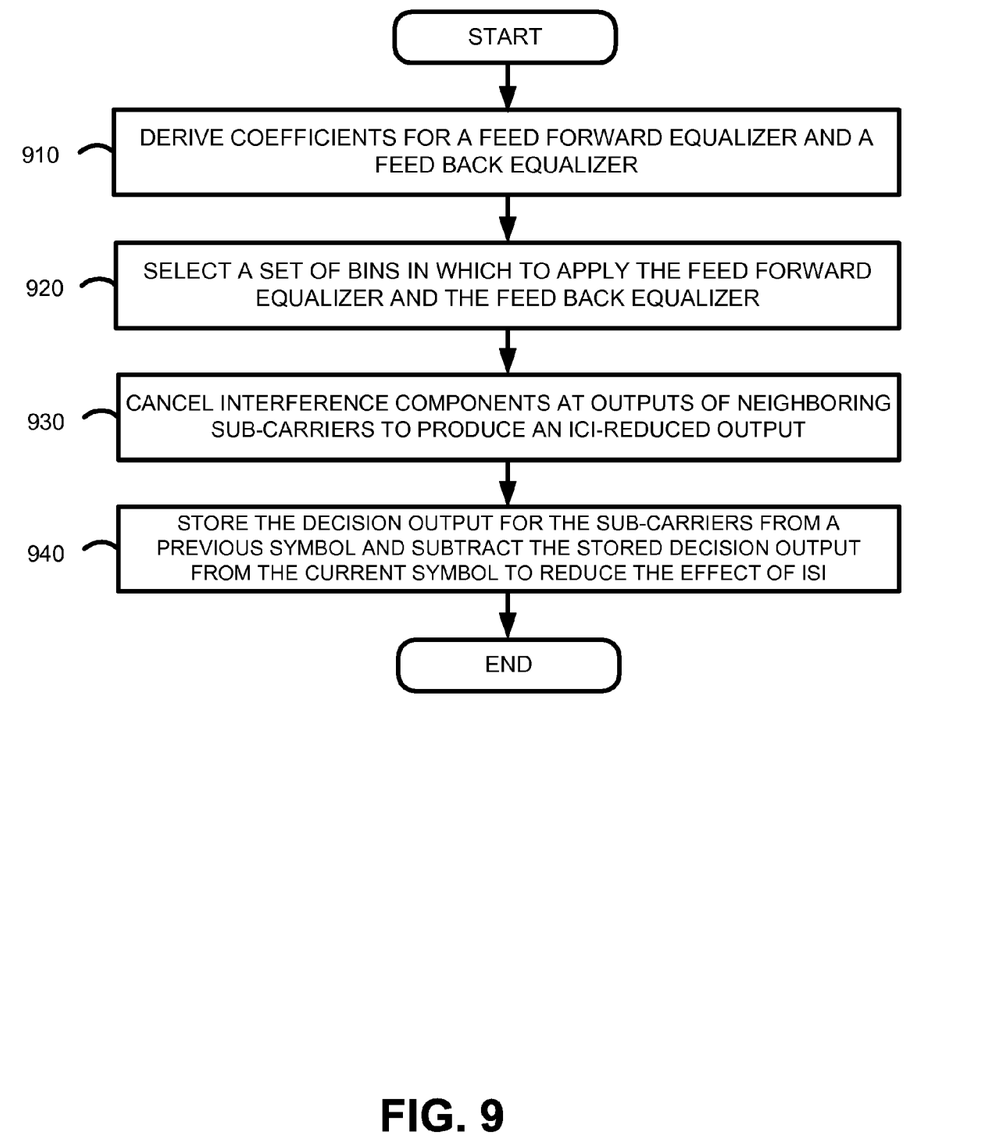
FIG. 9 is an embodiment for performing combined equalization utilizing the equalizer depicted in FIG. 2.

Reference is made to FIG. 9, which is an embodiment for performing combined equalization utilizing the equalizer depicted in FIG. 2. Beginning in block 910, coefficients for both the feed forward equalizer and the feed back equalizer are derived. In block 920, a set of bins in which to apply the feed forward equalizer and the feed back equalizer is selected. As described earlier, the tone selection process may be performed based on various criteria. In block 930, interference components at outputs of neighboring sub-carriers are canceled to produce an ICI-reduced output. Each sub-carrier output is sent to a slicer whose output is the hard limited decision for that symbol. The decision output for the sub-carriers from a previous symbol is stored and later and subtracted from the current symbol to reduce the effect of ISI (block 940).

Figure 10:
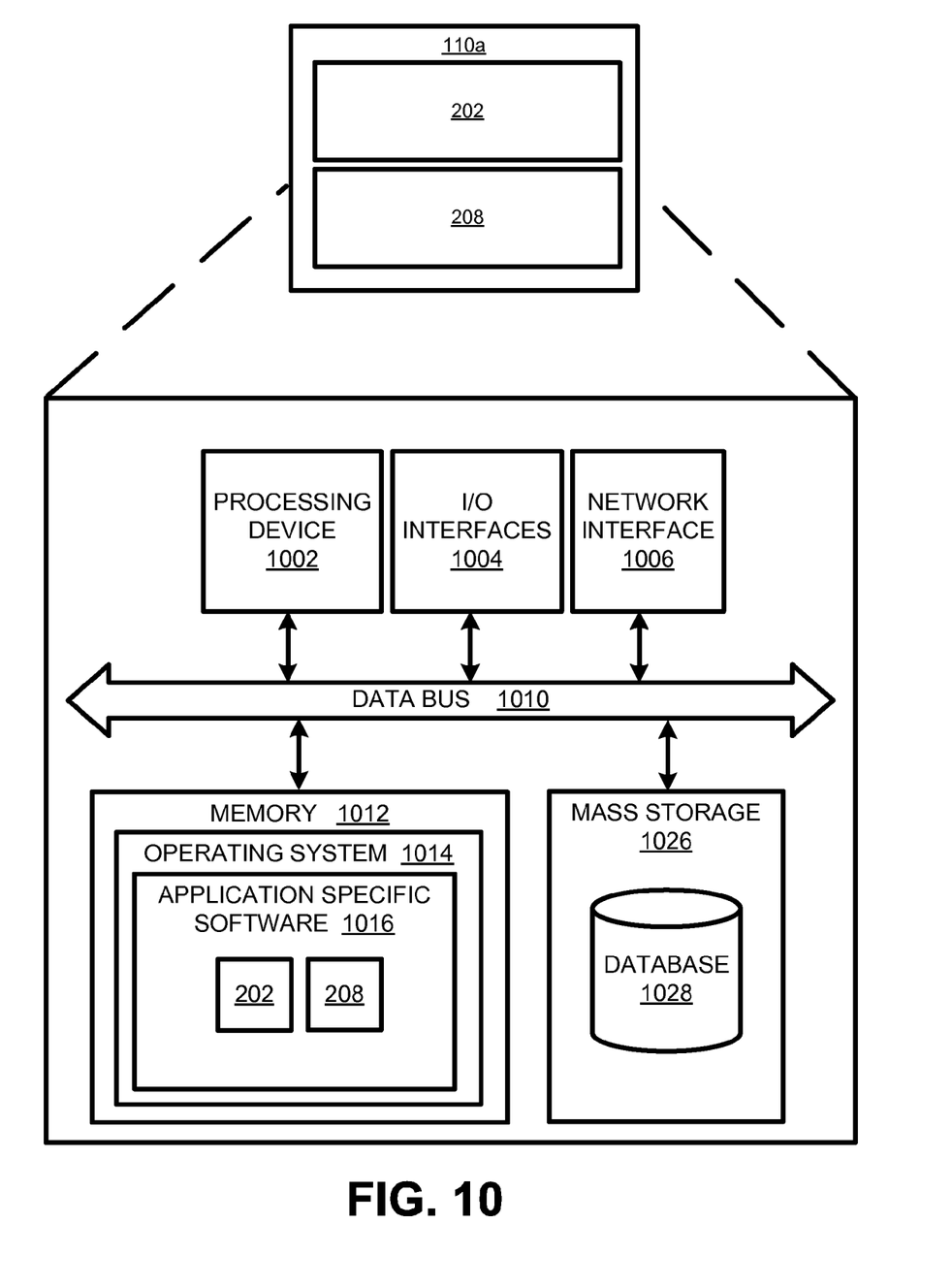
FIG. 10 illustrates an embodiment of the client shown in FIG. 2 incorporating the combined equalizer.

Reference is now made to FIG. 10, which illustrates an embodiment of the client shown in FIG. 2 incorporating the combined equalizer. Generally speaking, the client 110a can comprise any one of a wide variety of computing devices. Irrespective of its specific arrangement, the client 110a can, for instance, comprise memory 1012, a processing device 1002, a number of input/output interfaces 1004, a network interface 1006 (e.g., a wireless interface), and mass storage 1026, wherein each of these devices is connected across a data bus 1010.

Processing device 1002 can include any custom made or commercially available processor, a central processing unit (CPU) or an auxiliary processor among several processors associated with the client 110a, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 1012 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 1012 typically comprises a native operating system 1014, one or more native applications, emulation systems, or emulated applications for any of a variety of operating systems and/or emulated hardware platforms, emulated operating systems, etc. For example, the applications may include application specific software 1016 stored on a computer readable medium that is executed by the processing device 1002.

In accordance with some embodiments, the application specific software 1016 may include the time domain equalizer 202 and the combined equalizer 208 depicted in FIG. 2, where the application specific software 1016 is stored on a computer readable medium and is executed by the processing device 1002. It should be emphasized that while the time domain equalizer 202 and the combined equalizer 208 may be implemented in software executable by the processing device 1002, these components may also be implemented in hardware, firmware, or a combination of software, hardware, and firmware. One of ordinary skill in the art will appreciate that the memory 1012 can, and typically will, comprise other components which have been omitted for purposes of brevity.

Input/output interfaces 1004 provide any number of interfaces for the input and output of data. With further reference to FIG. 10, network interface device 1006 comprises various components used to transmit and/or receive data over a network environment. The client 110a may further comprise mass storage 1026. For some embodiments, the mass storage 1026 may include a database 1028.

In accordance with some embodiments, a block based combined equalizer may be incorporated. To reduce memory requirements and computational resources involved in the training phase, the sub-carriers can be grouped into blocks such that all sub-carriers in a given block share a common set of feed forward filter and feed back filter coefficients. The set of coefficients for a particular block may be obtained using various techniques. Such techniques may include, but are not limited to: 1) selecting the coefficients such that the error associated with the central bin of the block is minimized (this is based on the assumption that adjacent bins have similar characteristics); and 2) training the coefficients such that after every iteration, the average error (or weighted error sum) on the sub-carriers in a given block is minimized.

Figure 11:
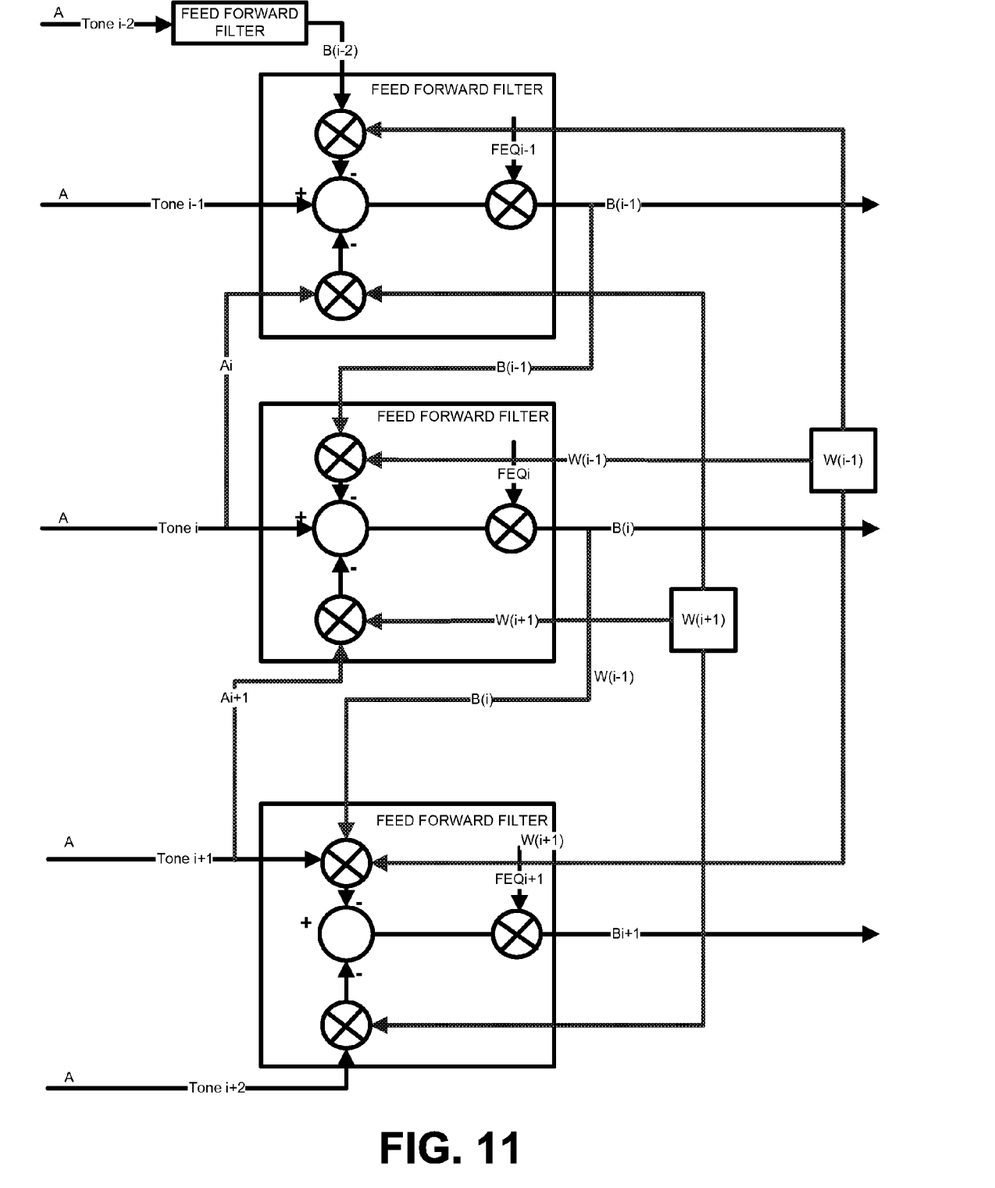
FIG. 11 illustrates the signal flow of multiple tones being operated on while utilizing a common set of coefficients.

By way of illustration, reference is now made to FIG. 11. For some embodiments, one set of feed forward (FF) and feed back (FB) coefficients are utilized across multiple tones. This is possible because ICI generally affects neighboring tones with the same weight. As non-limiting examples, blocks of 16 or 32 tones may be formed using the same coefficients, thereby reducing the memory requirements by a factor of 16 or 32, respectively. Training is performed based on error statistics from either all the tones or from a subset of all the tones. Note that a reduction in MIPS (million instructions per second) can be accomplished by utilizing a subset of tones.

In the non-limiting example depicted in FIG. 11, the feed forward filter depicted in FIG. 3 is shown for three tones that are operated on while utilizing a common set of coefficients. In particular, the three tones (i−1, i, and i+1) are operated on using a common pair of coefficients, w(i−1) and w(i+1), thereby reducing the amount of memory space needed to store the filter coefficients. As described earlier, the contributions from neighboring sub-carriers may be sampled at various points of the equalization chain, including for example, the input to the feed forward equalizer, A(i−p ,m); the output of the feed forward equalizer, B(i−p, m); and the output of the slicer circuit, C(i−p, m).

Suppose the parameter S represents the set of tones in a particular group with common filter coefficients w(n) for either the feed forward filter, the feed back filter, or a combination of both. Over M symbols, the coefficients for neighboring tones are determined based on the following:

$$w(i, i-p)=w(i-p) \forall i \in S \tag{Eq. 5}$$

$$w(i, i+p)=w(i+p) \forall i \in S \tag{Eq. 6}$$

For tone i and symbol m∈{1, 2. . . , M}, the error E(i, m) associated with tone i for symbol m may be defined as follows:

$$E(i, m)=C(i, m)-B(i, m) \tag{Eq. 7}$$

The coefficients w(n) can then be trained in an adaptive fashion based on the following:

$$w(n, m)=w(n, m-1)+\Sigma_{i \in S'} f[E(i, m), C(i-n, m)] \tag{Eq. 8}$$

where the function f(x, y) denotes f(x, y)=xconjugate(y). The final values of w(n, M) represent the converged coefficient values. In the equation above, the parameter S' represents a subset of the set of tones S. Based on the foregoing, the common filter coefficients w(n) is determined by:

$$w(n)=w(n, M) \tag{Eq. 9}$$

For alternative embodiments, the following may be first computed:

$$\sum_{m=1}^{M} E(i, m) * \text{conjugate}(C(i-p, m)) \quad \text{(Eq. 10)}$$

The values of the filter coefficients w(n) are then computed in a block fashion based on the values above. In the non-limiting example depicted in FIG. 11, the feed forward filter depicted in FIG. 3 is shown for three tones that are operated on while utilizing a common set of coefficients. In particular, the three tones (i−1, i, and i+1) are operated on using a common pair of coefficients, w(i−1) and w(i+1), thereby reducing the amount of memory space needed to store the filter coefficients.

To reduce computational requirements, the number of tones in set S' can be reduced to a value as low as 1. This, in effect, results in just one tone being selected to represent the entire set. As such, the coefficients are computed based on optimization of that one tone, rather than for all the tones. Note that the number of tones may be determined based on the memory and computational resources available for a given system.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A system, comprising:
   a time domain equalizer (TEQ) configured to receive a signal and shorten a CIR (channel impulse response) of the received signal;
   a Fast Fourier Transform (FFT) module for demodulating the received signal;
   an equalization block comprising at least one of: a feed forward equalizer and a feed back equalizer, wherein coefficients of the one or more equalizers are selected during a training sequence so as to reduce inter-carrier interference (ICI) and inter-symbol interference (ISI) in the received signal; and
   a slicer circuit configured to generate a hard-limited decision for a symbol corresponding to the received signal.

2. The system of claim 1, wherein the equalization block comprises:
   a feed forward equalizer configured to adaptively reduce ICI by sampling contributions of neighboring sub-carriers at one or more stages within the equalization block, wherein the one or more stages comprise:
   an input to the feed forward equalizer, A(i, m);
   an output of the feed forward equalizer, B(i, m); and
   an output of the slicer circuit, C(i, m);
   wherein (i) represents a sub-carrier and (m) represents a symbol of the received signal.

3. The system of claim 2, wherein the feed forward equalizer outputs an ICI-reduced signal B(i, m) based on at least one of:

$$B(i, m) = \left( A(i, m) - \sum_{p=1}^{n} w(i, i-p)B(i-p, m) - \sum_{p=1}^{n} w(i, i+p)A(i+p, m) \right) \times w(i, i);$$

$$B(i, m) = \left( A(i, m) - \sum_{p=1}^{n} w(i, i-p)A(i-p, m) - \sum_{p=1}^{n} w(i, i+p)A(i+p, m) \right) \times w(i, i); \text{ and}$$

$$B(i, m) = \left( A(i, m) - \sum_{p=1}^{n} w(i, i-p)C(i-p, m) - \sum_{p=1}^{n} w(i, i+p)A(i+p, m) \right) \times w(i, i),$$

wherein w(i, i−p) represents feed forward equalizer coefficients from sub-carrier (i−p) to sub-carrier (i), and n is the number of sub-carriers.

4. The system of claim 1, further comprising a training module configured to set coefficients for the feed forward equalizer utilizing an aperiodic sequence.

5. The system of claim 4, wherein the aperiodic sequence comprises the Medley sequence defined in ITU-T G992.3 (July 2002), and wherein the training module is configured to derive the coefficients prior to entering showtime.

6. The system of claim 5, wherein the training module is configured to derive the coefficients dynamically during showtime by correlating error on each bin with received data on one of: a prior symbol; and adjacent sub-carriers.

7. The system of claim 4, wherein the training module is configured to derive the coefficients based on one of: a set of predetermined tones; and tones selected from a set of tones, wherein the tones are selected based on magnitudes of the coefficients associated with the set of tones.

8. The system of claim 1, further comprising a tone selector configured to select a set of bins in which the feed forward equalizer is utilized, wherein the tone selector is configured to select the set of bins based on at least one of:
   SNR (signal-to-noise ratio) of bins;
   bins closest to a next integer bits of loading;
   bins selected based on bit loading;
   a set of predetermined bins; and
   bins selected based on magnitude of coefficients for the feed forward equalizer.

9. The system of claim 2, wherein the equalization block computes a single set of coefficients for training the feed forward equalizer across a plurality of neighboring tones.

10. The system of claim 9, wherein the equalization block computes the coefficients for only a portion of the plurality of neighboring tones as a representative of the plurality of neighboring tones.

11. The system of claim 1, wherein the equalization block comprises a feed back equalizer configured to operate across received symbols in the received signal to reduce ISI (inter-symbol interference), wherein the feed back equalizer is configured to subtract a stored output decision for sub-carriers from a symbol of a prior received signal from an output decision for a symbol of the received signal.

12. The system of claim 11, wherein the output decisions are derived from a slicer receiving sub-carrier outputs, wherein the output decisions are hard-limited decisions relating to the sub-carrier outputs.

13. The system of claim 11, wherein the feed back equalizer is configured to generate an output B(i, m) based on: B(i, m)=(A(i, m)−g(i, i−1)×C(i, m−1)), wherein A(i, m) is an output from the FFT module, wherein B(i, m) is a sub-carrier output, g(i, i−1) represents feed-back equalizer coefficients for symbol (i−1) to symbol (i), and C(i, m) represents an output from the slicer circuit.

14. The system of claim 11, wherein the equalization block computes a common set of coefficients for training the feed back equalizer across a plurality of neighboring tones.

15. The system of claim 14, wherein the equalization block computes the coefficients for only a subset of the plurality of neighboring tones as a representative of the plurality of neighboring tones.

16. The system of claim 1, wherein the equalization block comprises both a feed forward equalizer and a feed back equalizer.

17. The system of claim 16, further comprising a training module configured to set coefficients for the feed forward equalizer using a periodic sequence and coefficients for the feed back equalizer using an aperiodic sequence.

18. The system of claim 17, wherein the aperiodic sequence comprises the Medley sequence defined in ITU-T G992.3 (July 2002), and wherein the periodic sequence comprises the Reverb sequence defined in ITU-T G992.3 (July 2002).

19. The system of claim 16, wherein the equalization block computes a common set of coefficients for feed forward equalizer and a separate common set of coefficients for the feed back equalizer across a plurality of neighboring tones.

20. The system of claim 19, wherein the equalization block computes the coefficients for only a subset of the plurality of neighboring tones as a representative of the plurality of neighboring tones.

21. A method for performing combined equalization comprising:
deriving coefficients for a feed forward equalizer and a feed back equalizer;
selecting a set of bins in which to apply the feed forward equalizer and the feed back equalizer;
canceling interference components at outputs of neighboring sub-carriers to produce an output with reduced inter-carrier interference (ICI); and
subtracting a stored output decision for sub-carriers from a symbol of a prior received signal from an output decision for a symbol of the received signal to produce an output with reduced inter-symbol interference (ISI).

22. The method of claim 21, wherein deriving coefficients comprises computing a common set of coefficients for the feed forward equalizer and a separate set of common coefficients for the feed back equalizer across a plurality of neighboring tones in order to reduce memory storage requirements for the coefficients.

23. The method of claim 22, further comprising computing the coefficients for a subset of the plurality of neighboring tones as a representative of the plurality of neighboring tones in order to reduce computational requirements for training the feed forward equalizer and the feed back equalizer.

24. The method of claim 21, wherein deriving coefficients for the feed forward equalizer is performed using a periodic sequence, and wherein deriving coefficients for the feed back equalizer is performed using an aperiodic sequence.

25. The method of claim 24, wherein the aperiodic sequence comprises the Medley sequence and wherein the periodic sequence comprises the Reverb sequence defined in ITU-T G992.3 (July 2002).

26. The method of claim 21, further comprising tracking the coefficients during showtime by correlating error on each bin with received data on one of: a prior symbol; and adjacent sub-carriers.

27. A non-transitory computer readable medium storing a program executable on a processor, the program comprising:
equalization logic for reducing inter-carrier interference (ICI) and inter-symbol interference (ISI) from neighboring tones on a received signal;
logic for generating a hard-limited decision for a symbol corresponding to the received signal; and
training logic for deriving coefficients for the equalization logic using a training sequence and one or both of a predetermined set of known tones and information about the predetermined set of known tones.

28. The non-transitory computer readable medium of claim 27, wherein the equalization logic comprises a feed forward equalizer, and wherein the training logic is configured to derive coefficients for the feed forward equalizer utilizing the Reverb sequence defined in ITU-T G992.3 (July 2002).

29. The non-transitory computer readable medium of claim 27, wherein the equalization logic comprises a feed back equalizer configured to subtract a stored output decision for sub-carriers from a symbol of a prior received signal from an output decision for a symbol of the received signal.

30. The non-transitory computer readable medium of claim 27, wherein the equalization logic comprises a feed forward equalizer and a feed back equalizer combination, wherein the training logic is configured to derive coefficients for the feed forward equalizer utilizing one of the Reverb sequence and the Medley sequence defined in ITU-T G992.3 (July 2002), and wherein the training logic is further configured to derive coefficients for the feed back equalizer utilizing the Medley sequence defined in ITU-T G992.3 (July 2002).

31. The non-transitory computer readable medium of claim 27, wherein the equalization logic comprises a feed forward equalizer and a feed back equalizer combination, and wherein the training logic is configured to compute one set of coefficients across a plurality of neighboring tones for the feed forward equalizer and a separate set of coefficients for the feed back equalizer.

32. The non-transitory computer readable medium of claim 27, wherein the training logic is configured to compute the coefficients for one of the plurality of neighboring tones as a representative of the plurality of neighboring tones.

33. The non-transitory computer readable medium of claim 27, whether the training logic is further configured to dynamically adjust the coefficients during showtime by correlating error on each bin with received data on one of: a prior symbol; and adjacent sub-carriers.

34. The non-transitory computer readable medium of claim 27, further comprising a tone selector configured to select a set of bins in which the feed forward equalizer and the feed back equalizer are utilized, wherein the tone selector is configured to select the set of bins based on at least one of:
SNR (signal-to-noise ratio) of bins;
bins closest to next integer bits of loading;
bins selected based on bit loading;
a set of predetermined bins; and
bins selected based on magnitude of coefficients for the feed forward equalizer and feed back equalizer.

\* \* \* \* \*

UNITED STATES PATENT AND TRADEMARK OFFICE
CERTIFICATE OF CORRECTION

PATENT NO. : 8,290,033 B2  
APPLICATION NO. : 12/351071  
DATED : October 16, 2012  
INVENTOR(S) : Garg et al.

Page 1 of 1

It is certified that error appears in the above-identified patent and that said Letters Patent is hereby corrected as shown below:

On the Title Page, Item (75), under "Inventors", Line 3, delete "Satyavati Bhaw" and insert -- Aligarh --, therefor.

On the Title Page, Item (56), under "OTHER PUBLICATIONS", Line 1, delete "Taubock, Odling" and insert -- Tauböck, Ödling --, therefor.

On the Title Page, Item (56), under "OTHER PUBLICATIONS", Line 2, delete "Anaysis"," and insert -- Analysis", --, therefor.

On the Title Page, Item (56), under "OTHER PUBLICATIONS", Line 3, delete "2002. Access, Transmission, Networking. 2002 Zurich" and insert -- 2002, Access-Transmission-Networking, ETH Zurich, --, therefor.

In Column 2, Line 23, delete "XDSL" and insert -- xDSL --, therefor.

In Column 2, Line 59, delete "XDSL" and insert -- xDSL --, therefor.

In Column 2, Line 64, delete "XDSL" and insert -- xDSL --, therefor.

In Column 4, Line 66, delete "A1" and insert -- A1, --, therefor.

Signed and Sealed this  
Twenty-second Day of January, 2013

David J. Kappos  
*Director of the United States Patent and Trademark Office*